(12) United States Patent
Schmidt et al.

(10) Patent No.: US 7,870,324 B2
(45) Date of Patent: Jan. 11, 2011

(54) METHOD AND APPARATUS FOR SERIAL BUS COMMUNICATION

(75) Inventors: Glen E. Schmidt, Bartlesville, OK (US); Gregory J. Golden, Owasso, OK (US); Bob Farmer, Bartlesville, OK (US); Michel Baillargeon, Bartlesville, OK (US); Ray Shepherd, Tulsa, OK (US); Thomas Burghardt, Schwabach (DE)

(73) Assignee: Siemens Industry, Inc., Alpharetta, GA (US)

( * ) Notice: Subject to any disclaimer, the term of this patent is extended or adjusted under 35 U.S.C. 154(b) by 386 days.

(21) Appl. No.: 12/022,375

(22) Filed: Jan. 30, 2008

(65) Prior Publication Data

US 2008/0189456 A1 Aug. 7, 2008

Related U.S. Application Data

(60) Provisional application No. 60/898,889, filed on Feb. 1, 2007.

(51) Int. Cl.
*G06F 13/36* (2006.01)
*G06F 13/42* (2006.01)
*G06F 13/14* (2006.01)

(52) U.S. Cl. ............... 710/315; 710/105; 710/305

(58) Field of Classification Search ........... 710/104
See application file for complete search history.

(56) References Cited

U.S. PATENT DOCUMENTS 5,432,711 A 7/1995 Jackson et al.
6,037,857 A * 3/2000 Behrens et al. ............ 375/257
6,154,679 A * 11/2000 Kessler et al. ............... 700/9
6,154,683 A * 11/2000 Kessler et al. ............. 700/150
6,370,448 B1 * 4/2002 Eryurek ..................... 700/282
6,577,247 B2 6/2003 Giacaman
6,847,316 B1 * 1/2005 Keller ....................... 341/106

(Continued)

FOREIGN PATENT DOCUMENTS

WO WO 2007096586 A1 * 8/2007

OTHER PUBLICATIONS

"NeSSI™ (New Sampling/Sensor Initiative) Generation II Specification"; Center for Process Analytical Chemistry; Revision w0; Jun. 21, 2004; 53 pages.*

(Continued)

*Primary Examiner*—Ryan M Stiglic
(74) *Attorney, Agent, or Firm*—Filip A. Kowalewski

(57) ABSTRACT

A system and method for providing a serial communication bus is disclosed. A serial communication bus connects multiple footprint devices, such as electronic sensors in a process control sample system. The footprint devices can utilize various footprint device specific communication protocols. Multiple tophat devices act as general I/O ports for connecting with the footprint devices. Each tophat device identifies the footprint device specific communication protocol of a connected footprint device, converts outputs signals transmitted from the connected footprint device from the footprint device specific communication protocol of the footprint device to a standard bus communication protocol, and converts input signals directed to the connected footprint device from the standard bus communication protocol to the footprint device specific communication protocol of the footprint device. The serial communication bus connects the tophat devices and transmits input and output signals using the standard bus communication protocol.

23 Claims, 4 Drawing Sheets

U.S. PATENT DOCUMENTS

| | | | |
|---|---|---|---|
| 7,018,800 B2* | 3/2006 | Huisenga et al. | 435/6 |
| 2003/0023795 A1* | 1/2003 | Packwood et al. | 710/105 |
| 2003/0236937 A1* | 12/2003 | Barros De Almeida et al. | 710/305 |
| 2005/0195093 A1* | 9/2005 | Karschnia et al. | 340/693.1 |
| 2005/0228509 A1* | 10/2005 | James | 700/19 |
| 2006/0031577 A1* | 2/2006 | Peluso et al. | 709/243 |
| 2006/0065058 A1* | 3/2006 | Eriksen et al. | 73/756 |
| 2006/0155908 A1* | 7/2006 | Rotvold et al. | 710/315 |
| 2006/0259160 A1* | 11/2006 | Hood et al. | 700/20 |
| 2006/0282580 A1* | 12/2006 | Russell et al. | 710/62 |
| 2008/0168196 A1* | 7/2008 | Hassbjer et al. | 710/62 |
| 2008/0180226 A1* | 7/2008 | Schmidt | 340/286.01 |
| 2008/0276019 A1* | 11/2008 | Schmidt et al. | 710/105 |

OTHER PUBLICATIONS

"IEEE P1451.6 Home Page", downloaded from http://grouper.ieee.org/groups/1451/6/index.htm on Dec. 23, 2009.

"IEEE P1451.6 Scope & Purpose Page", downloaded from http://grouper.ieee.org/groups/1451/6/ScopePurpose.htm on Dec. 23, 2009.

"IEEE P1451.6 PAR Page", downloaded from http://grouper.ieee.org/groups/1451/6/PAR.htm on Dec. 23, 2009.

"IEEE P1451.6 Terms & Definitions Page", downloaded from http://grouper.ieee.org/groups/1451/6/TermsDefinitions.htm on Dec. 23, 2009.

"NeSSI (New Sampling/Sensor Initiative) Generation II Specification", Center of Process Analytical Chemistry, May 26, 2003.

"NeSSI (New Sampling/Sensor Initiative) Generation II Specification", Center of Process Analytical Chemistry, Jun. 21, 2004.

Dubois, Rob et al., "NeSSI—Generation II Revolution or Evolution?", ISA 2001, Houston Texas, Sep. 10, 2001.

"Industrial Automation using the CAN Bux Platform White Paper", Texas Instruments, May 2, 2003.

"Valve Communication Terminals" StoneL Corporation, downloaded from http://www.stonel.com/pdfs.vct_lit.pdf on Apr. 29, 2010.

"I.S. Isolators" pp. 3/50-3/51, downloaded from http://www.mega.ex.com/product_hazardous/Electrical%20Equipment/STAHL/03050051.pdf on Dec. 23, 2009.

"2001 IS Application Guide", Pepperl+Fuchs, Inc., pp. 28-29, downloaded from http://www.am.pepperl-fuchs.com/pdf/documents/fieldbusapplication.pdf on Dec. 23, 2009.

"Fieldbus Repeater for IEC 1158.2", Pepperl + Fuchs Group, downloaded from http://www.moniteurdevices.com/PDF/FF/PowerIS.pdf on Dec. 23, 2009.

"Fieldbus Intrinisically Safe Barrier and Repeater SB312-LP Datasheet", Smar Research Corporation, downloaded from http://www.smar.com/pdf/catalogs/SB312-LPDSB.pdf on Dec. 23, 2009.

"The I2C-Bus Specification", Version 2.1, Phillips Semiconductors, Jan. 2000.

"Profibus Guideline", Version 1.1, Jun. 2003.

"CANopen Intrinsically Safe Capable Physical Layer Specification", CiA Draft Standard Proposal 103, Version 1.0, Mar. 23, 2007.

* cited by examiner

METHOD AND APPARATUS FOR SERIAL BUS COMMUNICATION

This application claims the benefit of U.S. Provisional Application No. 60/898,889, filed Feb. 1, 2007, the disclosure of which is herein incorporated by reference.

BACKGROUND OF THE INVENTION

The present invention relates generally to a serial bus communication device, and more particularly to a serial bus communication device for use in a process control sample system.

In the process control industry, process analysis equipment is used to monitor and control chemical processes. Such process analysis equipment extracts samples of chemicals and analyzes the samples to evaluate a chemical process. When samples are extracted, the samples typically must be conditioned by a sample conditioning system before the sample can be properly analyzed. For example, a sample can be conditioned by altering the temperature, pressure, etc. of the sample to make the sample suitable for use by the analyzer. A sample conditioning system typically includes a large number of regulators, filters, gauges, flow meters and other mechanical components and is subject to high maintenance. Due to the high maintenance typically required for sample conditioning systems, it is desirable that electronic sensors be used so that maintenance can be predicted and reduced or avoided in the sample conditioning system.

The interior of a sample conditioning system is usually considered a hazardous area in which highly flammable gases are present. In order to implement electronic sensors in such areas and to connect the sensors to a process analyzer, special safety techniques must be used. One such technique is to place all sensors and electrical signals inside special explosion-proof housings which prevent the electronics from coming into contact with hazardous gases on the outside. This technique is common in other process electrical situations, but such housings are large, bulky, and expensive to install. Because the components in sample conditioning systems are relatively small, and are numerous, explosion proof housings become impractical, and therefore are not often used in process sampling systems. Another technique is to route electrical connections through an intrinsically safe (IS) barrier. An IS barrier is a device which is typically located at a border of a hazardous area and non-hazardous area to ensure that all electrical signals flowing between equipment in the non-hazardous area and equipment in the hazardous area are limited to an energy level below that which will ignite flammable gases. There are various IS standards set forth by various certifying agencies for a system to be considered IS. Such standards include International Electrical Commission (IEC) IEC 60079-11, Factory Mutual (FM) 3610, Underwriters Laboratories (UL) UL913, etc. However, this technique requires that each separate signal be individually connected through individual IS barriers. Although this is possible, the cost of installing IS barriers and connecting each electronic sensor separately through an IS barrier to a process analyzer is often prohibitive. Accordingly, an IS communication bus capable of connecting all of the electronic sensors to a process analyzer through a single IS barrier is desirable.

The need for a communication bus capable of connecting multiple electronic sensors through a single IS barrier is consistent with the New Sample/Sensor Initiative (NeSSI). NeSSI is an initiative which promotes the use of modular sample system component technology to implement sample systems that are associated with analytical process equipment. NeSSI Generation 2 involves intelligent control of modular sample systems by using electronic controls and sensors. In order to achieve intelligent control of modular sample systems, two-way communication must be established between the modular devices (e.g., electronic sensors) that make up the sample system and a control device. Accordingly, a digital communication bus is needed to connect the modular devices so that the modular devices can communicate using a particular protocol. Examples of protocols used to implement NeSSI sample systems may include Controller Area Network (CAN), $I^2C$, RS-485 based protocols such as Profibus or FieldbusS, RS-232 protocols, etc.

Profibus and Fieldbus are conventional communication buses widely used in the process industries. These buses are designed to permit installation of sensors and other instruments on large equipment in plant situations. Typically, such instruments are mounted individually and are large distances (up to several hundred feet) apart. These communication buses are available in a variety of implementations, including an intrinsically safe implementation. However, the IS versions are only capable of serving a small number of devices per each single instance of the bus. To serve more devices, additional instances of the bus must be established which requires duplicated and costly bus control apparatus. Because these buses are intended for a few devices located large distances apart, they are not well suited to sampling system usage which involves a large number of devices located closely together. Furthermore, Profibus and Fieldbus provide communication between the devices, but require the devices to have intelligence to enable the communication and support an established communication protocol. Accordingly, these buses are not very effective for enabling communication between simple devices, such as simple electronic sensors, which do not have integrated intelligence. While these buses can in principle be used for sampling system interface, the cost and system burdens involved in using them makes them costly and impractical for the purpose.

In a sampling conditioning system, there may be many types of sensors or devices, made by different vendors and utilizing different communication protocols. Many of these devices are simple sensors that have little or no intelligence in the device itself. These devices may be located in a limited amount of space. Accordingly, an IS communication bus is needed that is capable of connecting a large number of power consuming devices with limited intelligence, in a physically non-cumbersome manner.

BRIEF SUMMARY OF THE INVENTION

The present invention provides a communication bus for connecting multiple modular devices.

In one embodiments of the present invention, an apparatus provides serial bus communication to multiple footprint devices, such as electronic sensors in a process control sample system. As used herein, the term footprint device refers to a modular device, such as an electronic sensor in a process control sampling system. The footprint devices utilize various footprint device specific electrical signals and communication protocols. Multiple tophat devices act as general I/O ports for connecting with the footprint devices. As used herein, the term tophat device refers to a device that connects a communication bus to a footprint device. Each tophat device identifies the footprint device specific communication protocol of a connected footprint device, converts outputs signals transmitted by the connected footprint device from the footprint device specific communication protocol of the footprint device to a standard bus communication protocol, and converts input signals directed to the connected footprint device from the standard bus communication protocol to the footprint device specific communication protocol of the footprint device. A serial communication bus connects the tophat devices and transmits input and output signals using the standard bus communication protocol.

In another embodiment of the present invention, a system includes a controller, multiple footprint devices, and multiple tophat devices. Each tophat device connects to a footprint device and a serial communication bus, the bus connecting the tophat devices and the controller. The footprint devices utilize various footprint device specific communication protocols. The serial communication bus can connect to the controller through an intrinsically safe (IS) barrier. Each tophat device identifies the footprint device specific communication protocol of the footprint device connected to that tophat device, converts output signals transmitted by the connected footprint device from the footprint device specific communication protocol of the footprint device to a standard bus communication protocol, and converts input signals directed to the connected footprint device from the standard bus communication protocol to the footprint device specific communication protocol of the footprint device. The serial communication bus transmits input signals from the controller to the tophat devices using the standard bus communication protocol, and transmits output signals from the tophat devices to the controller using the standard bus communication protocol. The controller can be a process analyzer.

These and other advantages of the invention will be apparent to those of ordinary skill in the art by reference to the following detailed description and the accompanying drawings.

DETAILED DESCRIPTION

The present invention provides serial bus communication between modular devices in a process control sample system. According to an embodiment of the present invention, a serial bus communication structure is implemented in an auto-configurable data transport device with general I/O capabilities. The architecture described herein is applied to a process control "NeSSI" sample system, but the present invention is not limited to process control applications. According to various embodiments of the present invention, the communication bus encapsulates proprietary bus protocol structures, integrates vendor-specific device features in a proprietary communication bus protocol, and supports arm application dependent number of general I/O ports. The communication bus of the present invention is also capable of supporting multiple communication bus protocols in a compatible manner, and ensures that a standardized software and hardware interface exists between the communication bus and each device connected to the communication bus. Since industry agreement regarding the compatibility of various devices is difficult to achieve, the communication bus described herein removes the limitation of conventional communications that require that all process control components utilize the same communication protocol.

Figure 1:
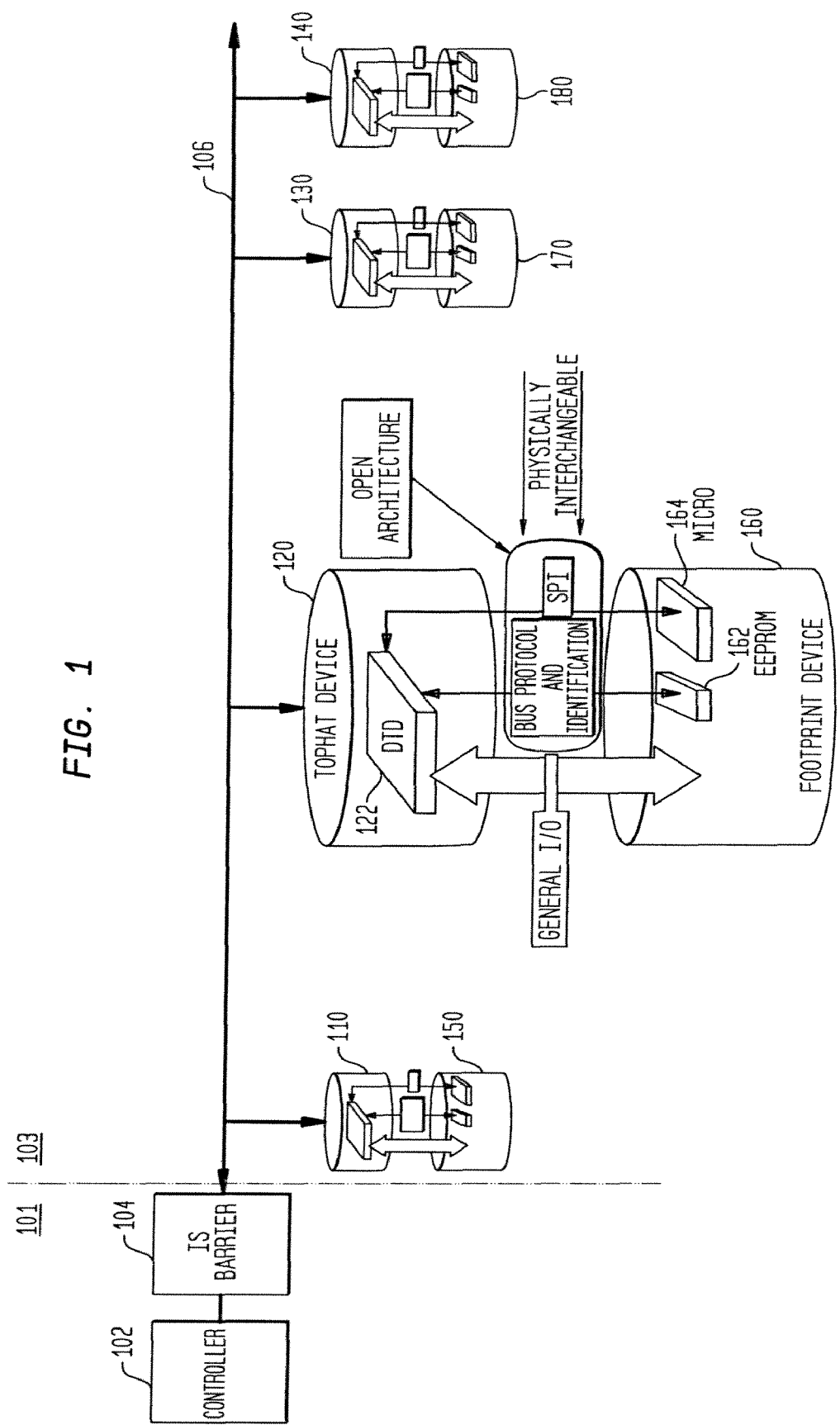
FIG. 1 is a block diagram illustrating a system for implementing a serial communication bus according to an embodiment of the present invention.

FIG. 1 is a block diagram illustrating a system for implementing a serial communication bus according to an embodiment of the present invention. As illustrated in FIG. 1, a serial communication bus 106 connects multiple foot print devices 150, 160, 170 and 180 to a controller 102 through an intrinsically safe (IS) barrier 104. The footprint devices 150, 160, 170, and 180 are modular devices which are controlled by the controller 102. For example, the footprint devices 150, 160, 170, and 180 can be electronic sensors for sensing various conditions, such as temperature pressure, flow, etc., in a chemical process. The controller 102 can be a process analyzer which controls the footprint devices 150, 160, 170 and 180 by transmitting electric signals through the communication bus 1065 and also processes signals received from the footprint devices 150, 160, 170, and 180 via the communication bus 106. In addition to the signals from the controller 102, the communication bus 106 can also supply power to the footprint devices 150, 160, 170, and 180. However the power does not have to be supplied by the bus. It can also be supplied from a separate power source.

The IS barrier 104 is a device which separates a hazardous area 103, in which explosive and/or flammable gas may be present, from a non-hazardous area 101. In the system of FIG. 1, the footprint devices (e.g., sensors) are located in the hazardous area 103 and the controller 102 is located in the non-hazardous area 101. The IS barrier 106 is located in the non-hazardous area 101 near a border between the non-hazardous area 101 and the hazardous area 103. Any equipment located in the hazardous area 103 is required to be IS. Accordingly, in the system of FIG. 1, the footprint devices 150, 160, 170, and 180, the communications bus 106 and the tophat devices 110, 120, 130, and 140 (described below) are all IS equipment. As used herein, an IS circuit system, or device is certifiably infallible based on one or more IS standard, including but not limited to IEC 60079-11 FM 3610 and UL913. According to an advantageous implementation, the IS barrier 106 can include a non-galvanically isolated IS barrier to convert electrical transmissions to IS signals and a galvanic isolator to galvanically isolate the IS equipment in the hazardous area 103 and the non-IS equipment in the non-hazardous area 101. The non-galvanically isolated IS barrier can be implemented as a diode barrier and may include an arrangement of fuses, rectifier diodes, resistors, and zener diodes. The galvanic isolator can be implemented as a monolithic digital isolator, an optical coupler, or any other device that meets IS standards for galvanic isolation. According to an embodiment of the present invention, the IS barrier 104 and the controller 102 may be implemented in the same device, for example in a process analyzer which controls the footprint devices 150, 160, 170, and 180 via the communication bus 106 with a built in IS barrier 104.

The serial communication bus 106 transmits electrical input signals from the controller 102 to each of the footprint devices 150, 160, 170, and 180 and electrical output signals from the footprint devices 150, 160, 170, and 180 to the controller 102. The serial communication bus 106 can include a data segment for transmitting digital data and a circuit for supplying power to the footprint devices 150, 160, 170, and 180. The serial communication bus 106 is used to connect multiple tophat devices 110, 120, 130, and 140, each of which connects to a respective footprint device 150, 160, 170, and 180. According to a possible implementation of the present invention, the serial communication bus 106 can be implemented as an Inter-Integrated Circuit ($I^2C$), which is adapted to connect the tophat devices 110, 120, 130, and 140, however, the present invention is not limited to implementing the communication bus 106 as an I²C. The serial communication bus 106 is intrinsically safe because of a certified IS design of the IS barrier 104, which establishes the IS condition, and IS circuitry in the top hat devices 110, 120, 130 and 140 that permits the footprint devices 150, 160, 170, and 180 to be connected to the serial communication bus 106 without compromising the IS condition.

The footprint devices 150, 160, 170, and 180 can be self contained measurement and control devices that may be as simple as a pressure or temperature sensor that can report a measurement, or a valve that responds to commands over the bus, or as complex as a device that measures parameters and controls pressure, flow and/or temperature. Each of the footprint devices 150, 160, 170, and 180 uses a footprint device specific communication protocol in order to input control signals and output data. As used herein, the term "footprint device specific communication protocol" refers to any method of communication or interconnection used by a footprint device. Accordingly, the footprint device specific communication protocol of a footprint device can be a software structure or type of language permitting two different computers or intelligent devices to communicate, or simple electrical signals used in a particular manner to transmit information. The footprint devices 150, 160, 170, and 180 may utilize different footprint device specific communication protocols from each other, and may utilize different footprint device specific communication protocols from the communication protocol used by the communication bus 106. For example, the footprint devices 150, 160, 170, and 180 may be made by different vendors and use vendor specific communication protocols. Each of the footprint devices 150, 160, 170, and 180 connects to a respective tophat device 110, 120, 130, and 140 in order to communicate with the communication bus 106. As used herein the term tophat device refers to a device which connects the communication bus to a footprint device. A tophat device acts as a general I/O port for connecting a footprint device to the communication bus, and provides an interface which allows the footprint device to communicate with the communication bus. The tophat devices 110, 120, 130, and 140 are interchangeable to any footprint device 150, 160, 170, and 180 with any footprint device specific communication protocol. The tophat devices 110, 120, 130, and 140 can connect to respective footprint devices 150, 160, 170, and 180 via a robust printed circuit board (PCB) to PCB connection. This allows for the physical separation of a footprint device from a tophat device. It is to be understood that the present invention is not limited to a PCB to PCB for connecting a tophat device to a footprint device, and various other connections may be utilized as well. For example, the tophat devices 110, 120, 130, and 140 can be implemented as monolithic silicon integrated circuits involving no printed circuit boards. Also, the tophat devices 110, 120, 130, and 140 can be implemented as multi-part electronic assemblies mounted adjacent to but separate from the footprint device.

The tophat devices 110, 120, 130, and 140 and footprint devices 150, 160, 170, and 180 are described herein in detail by referring to tophat device 120 and footprint device 160. It is to be understood that the other tophat devices 110, 130, and 140 and footprint devices 150, 170, and 180 can be implemented similarly. The tophat device 120 includes a data transport device (DTD) 122, which may be implemented as a Programmable Integrated Circuit. The DTD 122 identifies the footprint device specific communication protocol of the footprint device 160 that is connected to the tophat device 120. The DTD 122 then converts input and output signals between the tophat device 420 and the footprint device 160 from the footprint device specific communication protocol of the footprint device 160 to a standard bus communication protocol that is used by the serial communication bus 106. The input signals can be command signals transmitted by the controller 102 via the communication bus 106. These control signals are received at the tophat device 120 via the communication bus 106, converted from the standard bus communication protocol of the communication bus 106 to the footprint device specific communication protocol of the footprint device 160, and transmitted from the tophat device 120 to the footprint device 160. The output signals can include measurement data from the footprint device 1605 as well as diagnostic information regarding the footprint device 160. The output signals are received at the tophat device 120 from the footprint device 160, converted from the footprint device specific communication protocol of the footprint device 160 to the standard bus communication protocol, and transmitted to the controller 102 via the serial communication bus 106. As described above the controller can be a process analyzer which analyzes the data received from the footprint device 160.

The DTD 122 also can allow the tophat device 120 to implement a general I/O port along with a serial port interface by identifying the footprint device specific serial based communication protocol of the footprint device 160 and translating I/O signals between the footprint specific serial communication protocol of the footprint device 160 and the standard bus communication protocol. The footprint device can be equipped with an external EEPROM 162 and a microprocessor 164. Information regarding the footprint device 160 and the footprint device specific communication protocol of the footprint device 160 is stored on the EEPROM 162. When the tophat device 120 is connected to the footprint device 1605 the information stored on the EEPROM 162 is transmitted to the DTD 122. The DTD 122 uses this information to identify the footprint device specific communication protocol of the footprint device 160. Once the DTD 162 has identified the footprint device specific communication protocol, the DTD can retrieve information regarding the translation of the footprint device specific communication protocol to the standard bus communication protocol from the controller. This information can be stored in a database in a storage or memory at the controller. The micro processor 164 of the footprint device 160 communicates with the DTD 122 creating a footprint device specific serial protocol interface (SPI) to control the configuration and operating characteristics of the general I/O port provided by the tophat device 120 based on the information stored in the EEPROM 162. This permits third party vendors to configure the data transport device (i.e., the communication bus) to the exact needs of the footprint device 160. Furthermore, this creates an open architecture, which requires less coordination and compromise between the tophat device 120 and various types, models, and manufacturers of the footprint device 160. The communication structure between the tophat device 120 and the footprint device 160 allow the device-specific features of the footprint device 160 to be visible and accessible by other devices (e.g., footprint devices 150, 170, and 180 and controller 102) across the communication bus 106.

As described above, the tophat device 120 is not tailored to the specific needs of any particular footprint device 160. Instead, the footprint device 160 stores information regarding the footprint device specific communication protocol and any device specific features in the external EEPROM 162, and the tophat device 120 uses this information to enable communication with the footprint device 160 and to make the device-specific features of the footprint device 160 accessible to other devices across the serial communication bus 106. Accordingly, the tophat device 120 will work for any type of footprint device 160, and the implementation of an interchangeable footprint device 160 enables third party vendors to decrease the time required to design and implement their electronic equipment. According to various implementations of the present invention, the tophat devices 110, 120, 130, and 140 can be implemented and can communicate with the communication bus 106 using various communication standards as the standard bus communication protocol, including but not limited to CAN, Profibus, Fieldbus, and a proprietary protocol based on a "ruggedized" $I^2C$.

Although the footprint device 160 is described above as having an EEPROM 162 and microprocessor 164, the present invention is not limited thereto. Instead of retrieving information from an EEPROM in a footprint device, a tophat device can be configured to interconnect with a footprint device to receive simple electrical signals without requiring that the footprint device will have intelligence.

Figure 2:
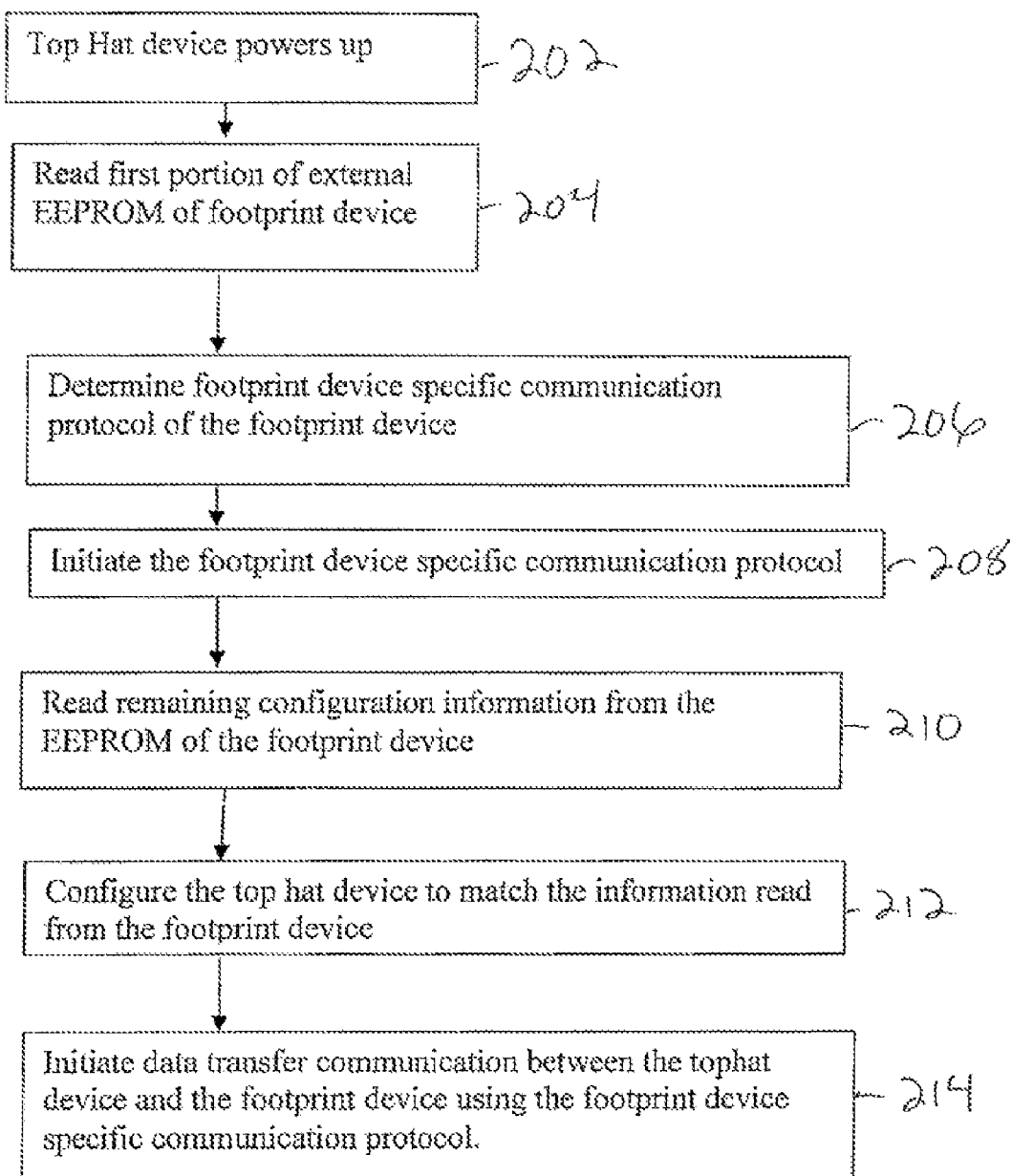
FIG. 2 is a flow chart illustrating a method of configuring a tophat device to communicate with a footprint device according to an embodiment of the present invention.

FIG. 2 is a flowchart illustrating a method of configuring a tophat device to communicate with a footprint device according to an embodiment of the present invention. FIG. 2 will be described while referring to FIG. 1, and in particular tophat device 120 and footprint device 160 of FIG. 1. As described above, the footprint device 160 can be a sensor in a process control sample system.

At step 202, the tophat device 120 that is connected to the footprint device powers up. At step 204, the tophat device 120 reads a first portion of the external EEPROM 162 of the footprint device 160. The first portion of the EEPROM 162 stores data that indicates the footprint device specific communication protocol of the footprint device 160. At step 206, the footprint device specific communication protocol of the footprint device 160 is determined by the tophat device 120 based on the information stored in the first portion of the EEPROM 162. At step 208, the tophat device 120 initiates the footprint device specific communication protocol in order to communicate with the footprint device 160. At step 210, the tophat device 120 reads remaining configuration information stored in the EEPROM 162 of the footprint device 160. The remaining configuration information can include such information as device type, capabilities, serial number, manufacturer, characteristics, calibration and ranging information, etc. At step 212, the tophat device 120 is configured to match the configuration information stored in the EEPROM 162 of the footprint device 160. This enables all device specific characteristics and features of the footprint device 160 to be accessible through the communication bus 106. At step 214, data transfer communication is initiated between the tophat device 120 and the footprint device 160 using the footprint device specific communication protocol. Accordingly, the tophat device 120 is configured to the footprint device 160, and the footprint device 160 can operate normally (using the footprint device specific communication protocol) through the tophat device 120.

Figure 3A:
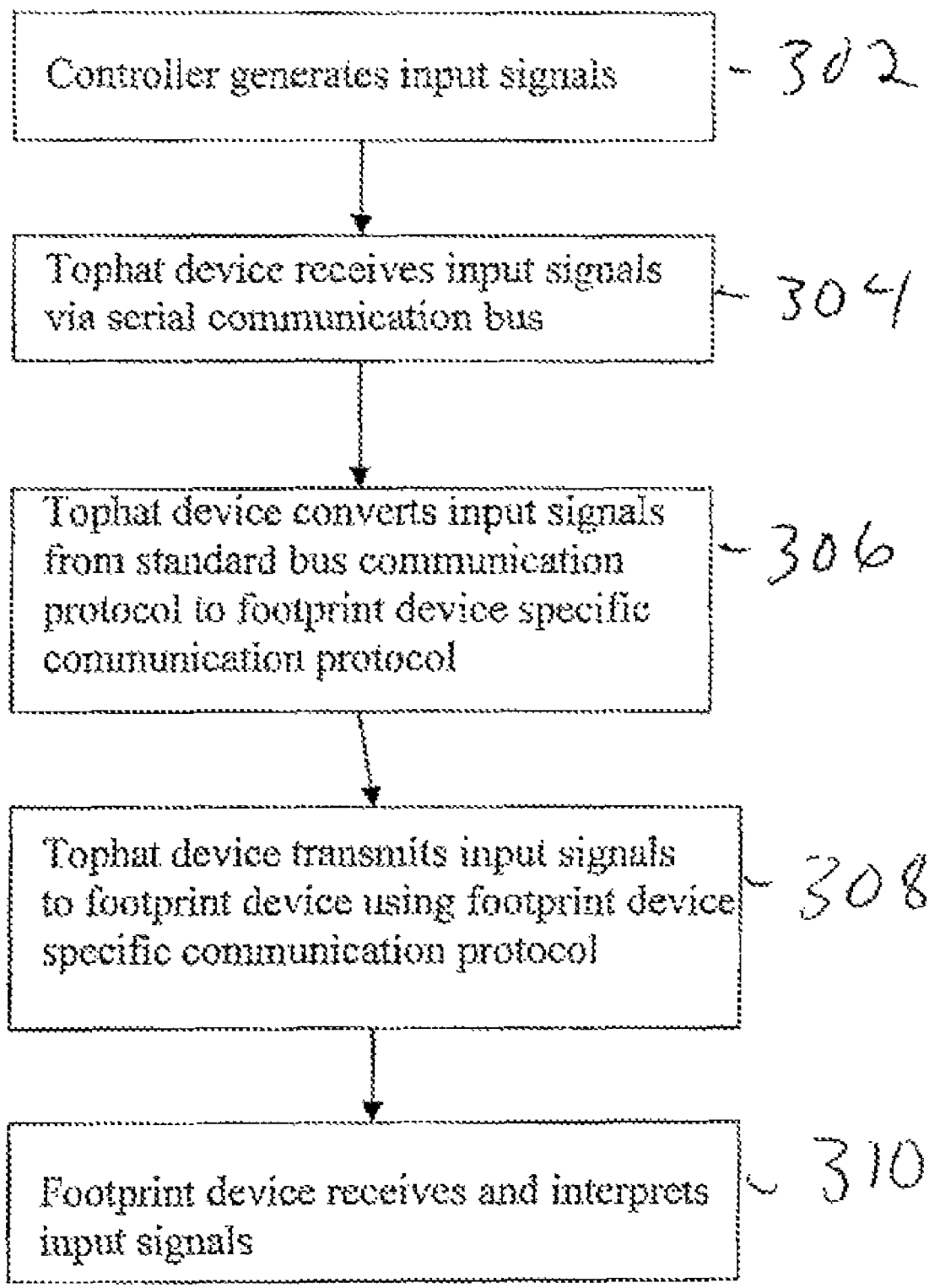
FIGS. 3A and 3B are flow charts illustrating methods of providing bus communication to and from a footprint device, respectively, according to embodiments of the present invention.
Figure 3B:
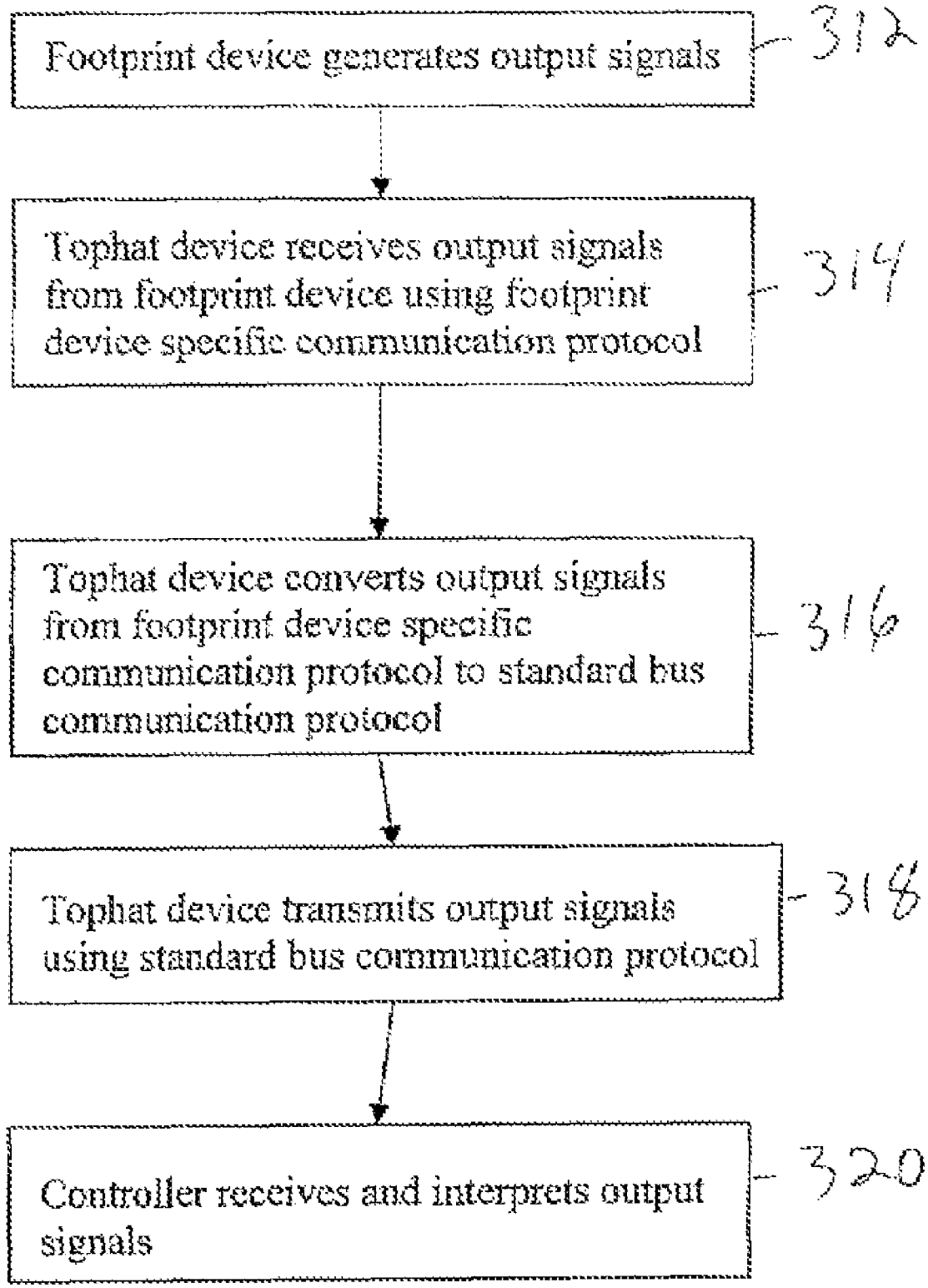

FIGS. 3A and 3B are flow charts illustrating methods of providing bus communication to and from a footprint device according to embodiments of the present invention. FIGS. 3A and 3B will be described while referring to FIG. 1 and in particular tophat device 120 and footprint device 160 of FIG. 1. As described above, the footprint device 160 can be a sensor in a process control sample system.

FIG. 3A illustrates a method of transmitting input signals to the footprint device 160. At step 302, the controller generates input signals. The input signals can be control signals directed to the footprint device 160 to control operations of the footprint device 160.

At step 304, the tophat device 120 receives the input signals via the serial communication bus 106. The input signals are transmitted to the tophat device 120 from the controller 102 via the serial communication bus 106 using the standard bus communication protocol of the communication bus 106. As described above, the standard bus communication protocol can be various protocols, including but not limited to CAN, Profibus, Fieldbus, and a proprietary protocol based on a "ruggedized" $I^2C$.

At step 306, the DTD 122 of the tophat device 120 converts the input signals from the standard bus communication protocol to the footprint device specific communication protocol of the footprint device 160. The conversion process may be of a variety of types. In a possible implementation, the DTD 122 may connect to the footprint device 160 through the use of dedicated and designated simple electrical signals such as analog input and output points or digital input and output points carried through a connector. In other possible implementations, the protocol conversion may involve use of a standard Serial Peripheral Interface protocol (SPI) for exchange of discrete information between the tophat device 120 and the microprocessor 164 or the EEPROM 162 directly, The tophat device 120 may also communicate with the EEPROM 162 using a simple $I^2C$ serial interface. It is to be understood that the nature of the protocol interface can vary as needed for the footprint device and is not inherently restricted in the present invention.

At step 308, the tophat device 120 transmits the input signals to the footprint device 160 using the footprint device specific communication protocol of the footprint device 160. The actual transmission of signals from the tophat device 120 to the footprint device 160 is accomplished physically following the conversion process. This can be accomplished by wires carrying discrete analog and digital voltages or by wires carrying SPI communication signals. The wiring necessary for these purposes may be connected by normal electronic connectors or by hard connection such as soldering.

At step 310, the footprint device 160 receives and interprets the input signals using the footprint device specific communication protocol. Accordingly, control signals transmitted from the controller 102 to control the footprint device 160 are received at the footprint device 160, and the footprint device 160 is controlled by the controller 102.

FIG. 3B illustrates a method of transmitting output signals from the footprint device 160. At step 312, the footprints device generates output signals. The output signals can include measurement data as well as diagnostic data regarding the footprint device 160.

At step 314, the tophat device 120 receives the output signals from the footprint device 160. The output signals are transmitted from the footprint device 160 to the tophat device 120 using the footprint device specific communication protocol of the footprint device 160.

At step 316, the DTD 122 of the tophat device 120 converts the output signals from the footprint device specific communication protocol of the footprint device 160 to the standard bus communication protocol of the serial communication bus 106.

At step 318, the tophat device 120 transmits the output signals to the controller 102 via the serial communication bus 106 using the standard bus communication protocol. At step 320, the controller 102 receives the output signals via the serial communication 106 and interprets the output signals. Accordingly, measurement data and diagnostic signals generated by the footprint device 160 are received at the controller 102. The controller 102 can then process the measurement data, for example for use in chemical analysis or sample system conditioning, and process the diagnostic information to determine whether maintenance is needed on the footprint device 160.

It is to be understood that various functions and method steps described herein can be performed by computer hardware or software or a combination hardware and software.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. An apparatus for providing serial bus communication to a plurality of footprint devices having footprint device specific communication protocols, comprising:
   a plurality of tophat devices each connectable to any one of a plurality of footprint devices having different footprint device specific communication protocols, each tophat device comprising a data transport device configured to identify a footprint device specific communication protocol of a footprint device connected to that tophat device, convert output signals received from the footprint device connected to that tophat device from the footprint device specific communication protocol of the connected footprint device to a standard bus communication protocol, and convert input signals directed to the footprint device connected to that tophat device from said standard bus communication protocol to the footprint device specific communication protocol of the connected footprint device; and
   a serial communication bus connecting said plurality of tophat devices, said serial communication bus configured to transmit the input signals to the plurality of tophat devices and the output signals from the plurality of tophat devices using said standard bus communication protocol.

2. The apparatus of claim 1, wherein the data transport device of each tophat device comprises a programmable integrated circuit.

3. The apparatus of claim 1, wherein said serial communication bus comprises a modified Inter-Integrated Circuit.

4. The apparatus of claim 1, wherein the data transport device of each tophat device is configured to retrieve information stored on an external EEPROM of the footprint device connected to that tophat device and identify the footprint device specific communication protocol of the footprint device based on the information.

5. The apparatus of claim 1, wherein the data transport device of each tophat device is configured to retrieve electrical signals from the footprint device connected to that tophat device and to interpret the electronic signals based on the footprint device specific communication protocol of the footprint device.

6. The apparatus of claim 1, wherein each of said plurality of footprint devices is an electronic sensor in a process control sample system.

7. The apparatus of claim 1, wherein the input signals directed to a footprint device comprise control signals and the output signals received from a footprint device comprise measurement data and diagnostic information regarding the connected footprint device.

8. The apparatus of claim 1, wherein each of said plurality of tophat devices is configured to provide power to the footprint device connected to that tophat device.

9. The apparatus of claim 1, wherein each of said plurality of tophat devices and said serial communication bus is intrinsically safe.

10. A system comprising:
    a plurality of footprint devices each having a footprint device specific communication protocol and configured to generate output signals using the footprint device specific communication protocol;
    a controller configured to generate input signals, for controlling the footprint devices, using a standard bus communication protocol; and
    a plurality of tophat devices, each connected to a respective one of the plurality of footprint devices, each tophat device comprising a data transport device configured to identify the footprint device specific communication protocol of the footprint device connected to that tophat device, convert output signals generated by the footprint device connected to that tophat device from the footprint device specific communication protocol to the standard bus communication protocol, and convert input signals directed to the footprint device connected to that tophat device from the standard bus communication protocol to the footprint device specific communication protocol, and
    a serial communication bus connecting the plurality of tophat devices to the controller, said serial communication bus configured to transmit the input signals from the controller to the plurality of tophat devices and the output signals from the plurality of tophat devices to the controller using said standard bus communication protocol.

11. The system of claim 10, further comprising:
    an intrinsically safe (IS) barrier connecting the controller and the serial communication bus.

12. The system of claim 11, wherein said IS barrier comprises:
    a non-galvanically isolated IS barrier connected to the controller, and
    a galvanic isolator connected between the non-galvanically isolated IS barrier and the serial communication bus.

13. The system of claim 11, wherein the controller and the IS barrier are implemented in the same device.

14. The system of claim 10, wherein said each of said plurality of footprint devices is an electronic sensor, said output signals comprise measurement data and diagnostic information, and the controller comprises a process analyzer configured to analyze the measurement data and diagnostic information.

15. The system of claim 10, wherein each of said plurality of footprint devices comprises:
    an external EEPROM configured to store identification information; and
    a microprocessor configured to control configuration and operating characteristics of a connected tophat device.

16. The system of claim 15, wherein the data transport device of each of said plurality of tophat devices is configured to identify the footprint device specific communication protocol of the footprint device connected to that tophat device based on the identification information stored in the external EEPROM of the footprint device.

17. The system of claim 10, wherein each of the plurality of tophat devices is connected to the respective one of the plurality of footprint devices via a printed circuit board to printed circuit board connection.

18. The system of claim 10, wherein said serial communication bus comprises a modified Inter-Integrated Circuit.

19. A method of providing serial bus communication to a plurality of footprint devices having various footprint device specific communication protocols, comprising:
- identifying a footprint device specific communication protocol of a footprint device;
- receiving input signals transmitted via a serial communication bus using a standard bus communication protocol and output signals transmitted from the footprint device using the footprint device specific communication protocol of the footprint device;
- converting the input signals from the standard bus communication protocol to the footprint device specific communication protocol of the footprint device;
- converting the output signals from the footprint device specific communication protocol of the footprint device to the standard bus communication protocol;
- transmitting the input signals to the footprint device using the footprint device specific communication protocol of the footprint device; and
- transmitting the output signals via the serial communication bus using the standard bus communication protocol.

20. The method of claim 19, wherein the standard bus communication protocol comprises one of CAN, Profibus, Fieldbus, and a footprint device specific protocol for a modified Inter-Integrated Circuit.

21. The method of claim 19, wherein said step of receiving input signals transmitted via a serial communication bus using a standard bus communication protocol comprises receiving input signals transmitted from a controller via the serial communication bus, and said step of transmitting the output signals via the serial communication bus using the standard bus communication protocol comprises transmitting the output signals to the controller via the serial communication bus.

22. The method of claim 21, wherein the input signals transmitted from the controller and the output signals transmitted to the controller are transmitted through an intrinsically safe barrier.

23. An apparatus for providing serial bus communication to a plurality of footprint devices having various footprint device specific communication protocols, comprising:
- means for identifying a footprint device specific communication protocol of a footprint device;
- means for receiving input signals transmitted via a serial communication bus using a standard bus communication protocol and output signals transmitted from the footprint device using the footprint device specific communication protocol of the footprint device;
- means for converting the input signals from the standard bus communication protocol to the footprint device specific communication protocol of the footprint device;
- means for converting the output signals from the footprint device specific communication protocol of the footprint device to the standard bus communication protocol;
- means for transmitting the input signals to the footprint device using the footprint device specific communication protocol of the footprint device; and
- means for transmitting the output signals via the serial communication bus using the standard bus communication protocol.

* * * * *